(12) United States Patent
Yan

(10) Patent No.: US 11,429,864 B1
(45) Date of Patent: Aug. 30, 2022

(54) SYSTEM AND METHOD FOR BANK-BALANCED SPARSE ACTIVATION AND JOINT-ACTIVATION-WEIGHT-SPARSE TRAINING OF NEURAL NETWORKS

(71) Applicant: MOFFETT TECHNOLOGIES CO., LIMITED, Central (HK)

(72) Inventor: Enxu Yan, Los Altos, CA (US)

(73) Assignee: MOFFETT INTERNATIONAL CO., LIMITED, Hong Kong (HK)

( * ) Notice: Subject to any disclaimer, the term of this patent is extended or adjusted under 35 U.S.C. 154(b) by 0 days.

(21) Appl. No.: 17/403,668

(22) Filed: Aug. 16, 2021

(51) Int. Cl.
*G06N 3/08* (2006.01)

(52) U.S. Cl.
CPC .................................. *G06N 3/084* (2013.01)

(58) Field of Classification Search
CPC ...................................................... G06N 3/084
See application file for complete search history.

(56) References Cited

U.S. PATENT DOCUMENTS

2020/0104692 A1* 4/2020 Hill ........................... G06F 5/06
2020/0285949 A1* 9/2020 Baum .................. G06N 3/0454

OTHER PUBLICATIONS

Wiedemann, Simon, Temesgen Mehari, Kevin Kepp, and Wojciech Samek. "Dithered backprop: A sparse and quantized backpropagation algorithm for more efficient deep neural network training." In Proceedings of the IEEE/CVF Conference on Computer Vision and Pattern Recognition Workshops, pp. 720-721. 2020. (Year: 2020).*
Kostopoulou, Kelly, Hang Xu, Aritra Dutta, Xin Li, Alexandros Ntoulas, and Panos Kalnis. "DeepReduce: A Sparse-tensor Communication Framework for Distributed Deep Learning." arXiv preprint arXiv:2102.03112 (Feb. 5, 2021). (Year: 2021).*
Hubara, Itay, Brian Chmiel, Moshe Island, Ron Banner, Seffi Naor, and Daniel Soudry. "Accelerated sparse neural training: A provable and efficient method to find n: m transposable masks." arXiv preprint arXiv:2102.08124 (Feb. 16, 2021). (Year: 2021).*
Cao et al. "Efficient and effective sparse LSTM on fpga with bank-balanced sparsity." Proceedings of the 2019 ACM/SIGDA International Symposium on Field-Programmable Gate Arrays. 2019, pp. 63-72.

(Continued)

*Primary Examiner* — Alexey Shmatov
*Assistant Examiner* — Casey R. Garner

(57) ABSTRACT

Methods, systems, and apparatus, including computer programs encoded on computer storage media, for optimizing neural network training, are described. The method may include: during a forward propagation at a current layer of a neural network, generating, based on a sparse input tensor and a sparse weight tensor of the current layer, a dense output tensor, and sparsifying the dense output tensor to obtain a sparse output tensor; during a backward propagation at the current layer of the neural network: determining a first sparse derivative tensor based on the sparse output tensor, obtaining a dense derivative tensor based on the first sparse derivative tensor and the sparse weight tensor of the current layer, and sparsifying the dense derivative tensor to obtain a second sparse derivative tensor; and training weight tensors of the neural network based on the first sparse derivative tensor and the second sparse derivative tensor.

17 Claims, 11 Drawing Sheets

110 → Forward Propagation:

120 → Backward Propagation:

130 → Weight Gradient Update:

(56) References Cited

OTHER PUBLICATIONS

Yao et al. "Balanced sparsity for efficient DNN inference on GPU." Proceedings of the AAAI Conference on Artificial Intelligence. vol. 33, 2019, 8 pages.

Yang et al. "Joint Regularization on Activations and Weights for Efficient Neural Network Pruning." 2019 18th IEEE International Conference on Machine Learning and Applications (ICMLA). IEEE, 2019, pp. 790-797.

Han et al. "Learning both weights and connections for efficient neural network." Advances in neural information processing systems, 2015, 9 pages.

\* cited by examiner

Weight Gradient Update: $A_1^T \otimes \nabla_{R_1} = \nabla_W$

Bank-balanced sparsity: 2d

FIG. 6A

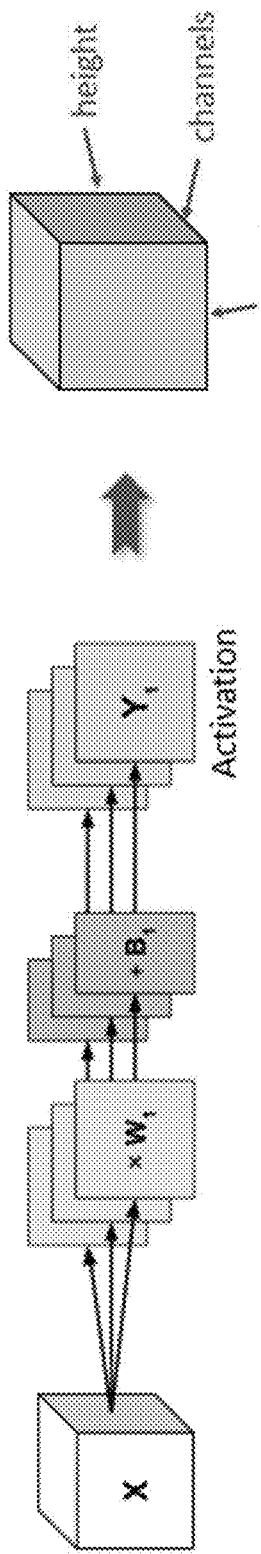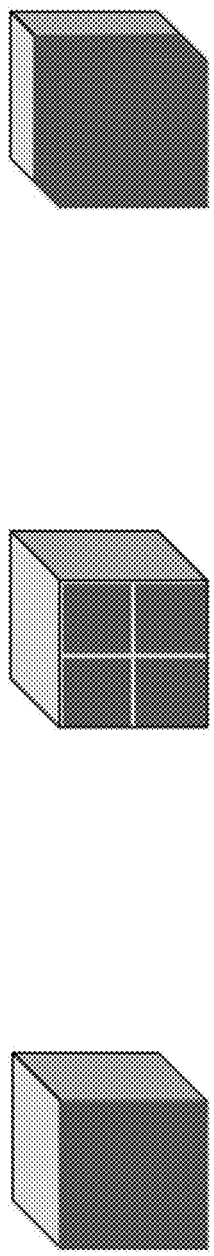
FIG. 6B

700

710 — during a forward propagation at a current layer of a neural network:
  generating, based on a sparse input tensor and a sparse weight tensor of the current layer, a dense output tensor; and
  obtaining a sparse output tensor by sparsifying the dense output tensor

720 — during a backward propagation at the current layer of the neural network:
  determining a first sparse derivative tensor based on the sparse output tensor; obtaining a dense derivative tensor based on the first sparse derivative tensor and the sparse weight tensor of the current layer; and
  obtaining a second sparse derivative tensor by sparsifying the dense derivative tensor

730 — training weight tensors of the neural network based on the first sparse derivative tensor and the second sparse derivative tensor

SYSTEM AND METHOD FOR BANK-BALANCED SPARSE ACTIVATION AND JOINT-ACTIVATION-WEIGHT-SPARSE TRAINING OF NEURAL NETWORKS

TECHNICAL FIELD

The disclosure generally relates to training of artificial intelligence (AI) models, more particularly to joint-Activation-Weight-sparse (hereinafter referred to as joint-A-W-sparse) training of a bank-balanced neural network (NN).

BACKGROUND

Neural networks (NN) are currently the foundation for many modern artificial intelligence (AI) applications such as image and video recognition, recommender systems, classification, medical image analysis, and natural language processing. Before an NN can be deployed for inferencing, it needs to be trained. Training an NN model involves using a training dataset to iteratively update the model weights to create an accurate mapping of inputs to outputs. Today's NN training process generally includes a large number of iterations of forward propagation and backward propagation. Due to the massive amount of training data to be computed (e.g., convoluted in a CNN) and the number of weights to be trained/updated during each training iteration, the training of NN models is computationally intensive and thus costly.

In recent years, various approaches have been developed to improve the efficiency of NNs by introducing sparsity to NNs, such as pruning the weight tensors of the NNs to reduce the size of the trained NN models and the amount of data to be computed for inferencing. However, the sparsity has not been fully exploited to boost the training speed for NNs. This disclosure describes a new solution to introduce sparsity during both forward propagation and backward propagation to improve the efficiency of the NN training process. In addition, the sparsity introduced to the weight tensors and activation tensors is tailored as bank-balanced in order to optimize hardware efficiency.

SUMMARY

Various embodiments of the present specification may include systems, methods, and non-transitory computer-readable media for optimizing neural network training.

According to one aspect, the method may include: during a forward propagation at a current layer of a neural network, generating, based on a sparse input tensor and a sparse weight tensor of the current layer, a dense output tensor; and obtaining a sparse output tensor by sparsifying the dense output tensor; during a backward propagation at the current layer of the neural network, determining a first sparse derivative tensor based on the sparse output tensor; obtaining a dense derivative tensor based on the first sparse derivative tensor and the sparse weight tensor of the current layer; and obtaining a second sparse derivative tensor by sparsifying the dense derivative tensor; and training weight tensors of the neural network based on the first sparse derivative tensor and the second sparse derivative tensor.

In some embodiments, the dense output tensor comprises a tensor product of the sparse input tensor and the sparse weight tensor of the current layer; and the dense derivative tensor comprises a tensor product of the first sparse derivative tensor and the sparse weight tensor of the current layer.

In some embodiments, the training the weight tensors of the neural network comprises: determining a new sparse weight tensor for a previous layer based on the second sparse derivative tensor.

In some embodiments, the training the weight tensors of the neural network comprises: determining a new sparse weight tensor for the current layer based on the first sparse derivative tensor and the sparse input tensor.

In some embodiments, the current layer of the neural network corresponds to a weight tensor mask, and the determining a new sparse weight tensor for the current layer comprises: obtaining a dense derivative weight tensor based on a tensor product of the first sparse derivative tensor and a transpose of the sparse input tensor; and disabling one or more weights in the dense derivative weight tensor by applying the weight tensor mask to the dense derivative weight tensor to obtain the new sparse weight tensor for the current layer.

In some embodiments, the dense derivative weight tensor comprises a plurality of gradients corresponding to a plurality of weight parameters at the current layer of the neural network.

In some embodiments, the determining a new sparse weight tensor for the current layer comprises: obtaining a dense derivative weight tensor based on a tensor product of the first sparse derivative tensor and a transpose of the sparse input tensor; and applying a top-K activation function to the dense derivative weight tensor to obtain the new sparse weight tensor for the current layer.

In some embodiments, applying the top-K activation function comprises: dividing each row or column of the dense derivative weight tensor into a plurality of banks corresponding to memory banks of processors; and for each of the plurality of banks, determining top-K weights in the bank and disabling weights in the bank that are not the top-K weights.

In some embodiments, the obtaining a sparse output tensor by sparsifying the dense output tensor comprises: applying a top-K activation function to the dense output tensor to obtain the sparse output tensor; and the obtaining a second sparse derivative tensor by sparsifying the dense derivative tensor comprises: applying the top-K activation function to the dense derivative tensor to obtain the second sparse derivative tensor.

In some embodiments, the current layer of the neural network comprise a dense weight tensor and corresponds to a weight tensor mask, and the sparse weight tensor of the current layer is obtained by: disabling one or more weights in the dense weight tensor by applying the weight tensor mask to the dense weight tensor to obtain the sparse weight tensor.

According to another aspect, a system for optimizing neural network training is described. The system may comprise one or more processors and one or more non-transitory computer-readable memories coupled to the one or more processors and configured with instructions executable by the one or more processors to cause the system to perform operations including: during a forward propagation at a current layer of a neural network, generating, based on a sparse input tensor and a sparse weight tensor of the current layer, a dense output tensor; and obtaining a sparse output tensor by sparsifying the dense output tensor; during a backward propagation at the current layer of the neural network, determining a first sparse derivative tensor based on the sparse output tensor; obtaining a dense derivative tensor based on the first sparse derivative tensor and the sparse weight tensor of the current layer; and obtaining a second sparse derivative tensor by sparsifying the dense derivative tensor; and training weight tensors of the neural network based on the first sparse derivative tensor and the second sparse derivative tensor.

According to yet another aspect, a non-transitory computer-readable storage medium for optimizing neural network training is described. The non-transitory computer-readable storage medium may be configured with instructions executable by one or more processors to cause the one or more processors to perform operations comprising: during a forward propagation at a current layer of a neural network, generating, based on a sparse input tensor and a sparse weight tensor of the current layer, a dense output tensor; and obtaining a sparse output tensor by sparsifying the dense output tensor; during a backward propagation at the current layer of the neural network, determining a first sparse derivative tensor based on the sparse output tensor; obtaining a dense derivative tensor based on the first sparse derivative tensor and the sparse weight tensor of the current layer; and obtaining a second sparse derivative tensor by sparsifying the dense derivative tensor; and training weight tensors of the neural network based on the first sparse derivative tensor and the second sparse derivative tensor.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 5A illustrates an exemplary weight gradient update process in a joint-AW-sparse training of bank-balanced NN in accordance with various embodiments.

FIG. 5C illustrates another exemplary method for updating weight gradient in a joint-AW-sparse training of bank-balanced NN in accordance with various embodiments.

FIG. 6A illustrates an exemplary 2D sparsification for generating bank-balanced sparsified tensors in accordance with various embodiments.

FIG. 6B illustrates an exemplary 3D sparsification for generating bank-balanced sparsified tensors in accordance with various embodiments.

FIG. 7 illustrates an example method for joint-AW-sparse training of a bank-balanced NN in accordance with various embodiments.

DETAILED DESCRIPTION

Embodiments described herein provide methods, systems, apparatus for joint-Activation-Weight-sparse (hereinafter referred to as joint-A-W-sparse) training of a bank-balanced NN. In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Figure 1:
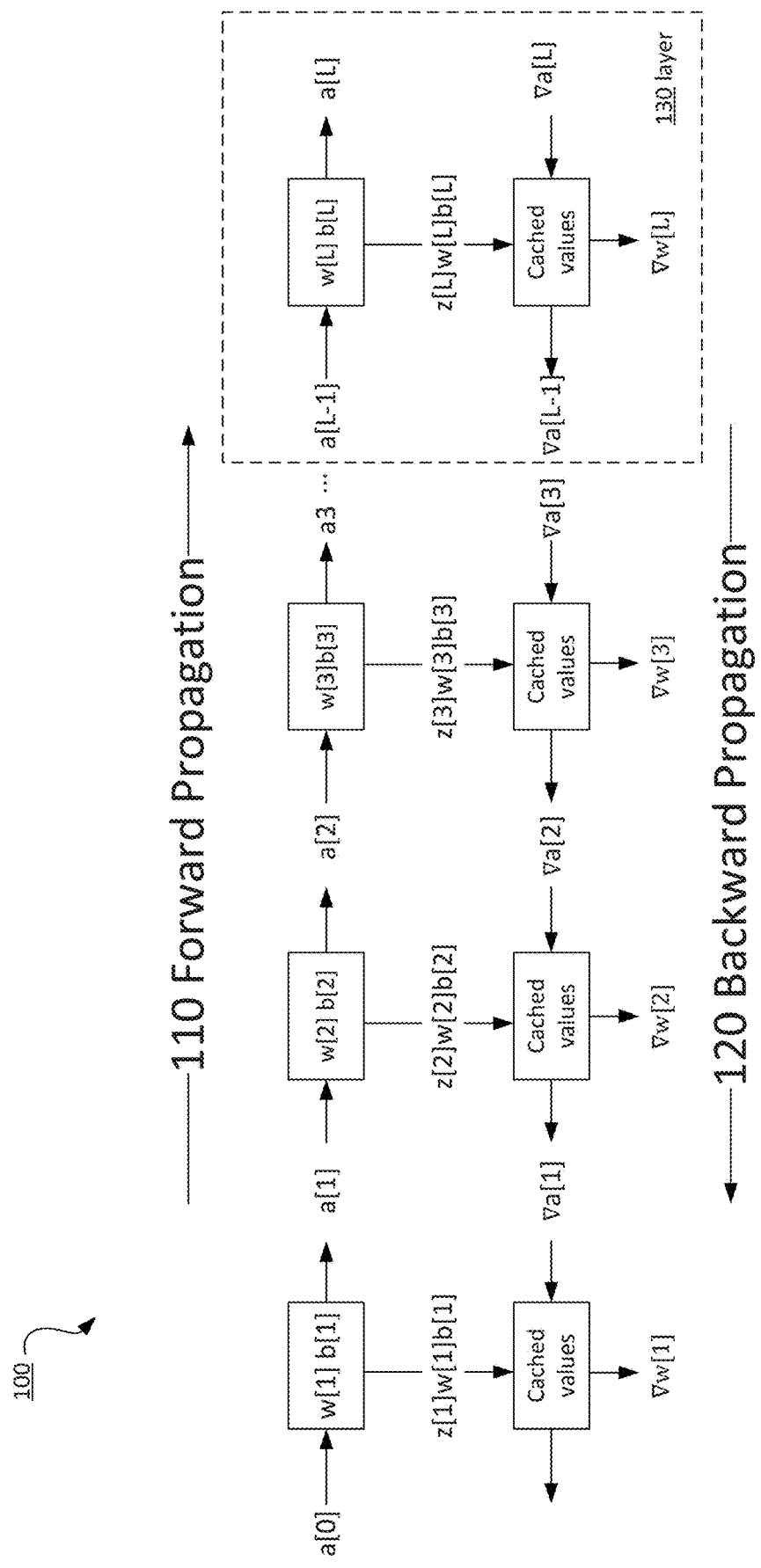
FIG. 1 illustrates an exemplary training process of a neural network (NN) in accordance with various embodiments.

FIG. 1 illustrates an exemplary training process 100 of a neural network (NN) in accordance with various embodiments. The embodiments described in this disclosure may be implemented as a part of the illustrative training process in FIG. 1 or another suitable NN training method to improve training efficiency.

As shown in FIG. 1, an exemplary NN includes a plurality of layers 130, e.g., layer 1, 2, 3, . . . , L, . . . etc. Each layer 130 may include a plurality of parameters, such as a weight tensor, a bias tensor, etc. "Tensor" refers to a primary data structure in the realm of deep learning, including rank-1 tensor (vector), rank-2 tensor (matrix), and higher rank tensors.

The illustrative training process 100 includes a plurality of iterations to train the parameters of the NN. Each iteration may include a forward propagation (or forward pass) 110 and a backward propagation (or backward pass) 120. The forward propagation 110 involves the calculation and storage of intermediate variables (including outputs) for a neural network in order from the input layer to the output layer. The backward propagation 120 involves calculating the gradient of NN parameters, which may be used as the basis to update the parameters of the NN.

For illustrative purposes, layer L in FIG. 1 is selected as an example to describe the operations involved in the forward propagation 110 and the backward propagation 120. Assuming an input tensor from the previous L−1 layer is a[L−1], and layer L has a weight term (e.g., a weight tensor) w[L] and a bias term (e.g., a bias tensor) b[L]. The intermediate variable may be calculated and denoted as z[L]=w[L]a[L−1]+b[L], in which both w and a are tensors, and z is a tensor product of w and a. After running the intermediate variable z through an activation function $\phi$, an activation tensor may be obtained as a[L+1]=$\phi$(z). This activation tensor a [L+1] may be used as an input for the forward propagation at the L+1 (the next) layer. In some cases, the z[L] may be stored in a cache as an intermediate variable for calculations (e.g., avoiding repetitive computations) during backward propagation 120. In addition, the weight tensor w[L] and the bias tensor b[L] may also be stored in a cache to avoid unnecessary external memory access during back propagation 120. The forward propagation process continues to the output layer of the NN. The output tensor of the output layer may be fed into a loss function along with training label(s) of the training data to determine a loss (e.g., a quantified performance of the NN with current parameters). Then the loss may be combined with a regularization term (such as L2 regularization) to determine an objective function.

The objective of the backward propagation 120 is to calculate gradients. The gradients may then be used to update the corresponding weight parameters of the NN to minimize the loss or maximize the objective function. During the backward propagation 120, derivatives of the activation tensors may be computed iteratively through all the layers. For example, in the L-th layer of the NN, the derivative of the activation tensor for the L-th layer may be obtained as ∇a[L]. The weight tensor of the L-th layer w[L] may be multiplied with ∇a[L] to obtain the derivative of the activation tensor for the (L−1)-th layer. This process may continue until the first layer of the NN. Here, the multiplication may refer to an operation to obtain a tensor product of two tensors. At layer L, the tensor product of the derivative ∇a[L] and the transpose of the input tensor a [L] may be computed as the derivative of the weight tensor at L-th layer, denoted as ∇W[L]. Based on ∇W[L], the weight parameters at the L-th layer may be updated accordingly to fit the training data. It may be noted that the derivatives described above may be also referred to as the gradients of the corresponding variables.

In some embodiments, sparsity may be introduced to each of the above-described steps, including the forward propagation, the backward propagation, and the weight gradient computation, to improve the training efficiency. The existing sparsification-based NN training methods usually focus on the forward propagation (e.g., by pruning the tensors in the forward pass) but ignore the backward propagation. The embodiments described below describe a method and a system in which all the tensors, including the derivative tensors, are pruned in both the forward propagation and the backward propagation to optimize the training efficiency. In addition, the updated weight tensor at each layer after each round of backward propagation is pruned in a bank-balanced way so that the resultant trained NN is optimized for the underlying hardware architectures, such as being aligned with the memory banks in the processors (e.g., GPU, TPU, NPU). The bank-balanced NN may support balanced parallel processing using multi-core systems (the loads on the cores are balanced) and optimize memory access during inferencing by minimizing bank conflicts (avoid access congestions to some banks). For the types of memories that store information in banks, a bank conflict can occur when a same bank is accessed continuously with random addresses. For example, if two consecutive accesses are on different rows in a same bank, these two accesses may not be performed simultaneously. In fact, for many types of memory (e.g., DDR), there can be multiple cycles of delays between each memory access on a same bank. For example, if a next memory access is on a different row in the same bank, the next memory access may need to wait for 12 cycles before it can be completed. As a result, bank conflicts can cause significant delays in the system.

Figure 2:
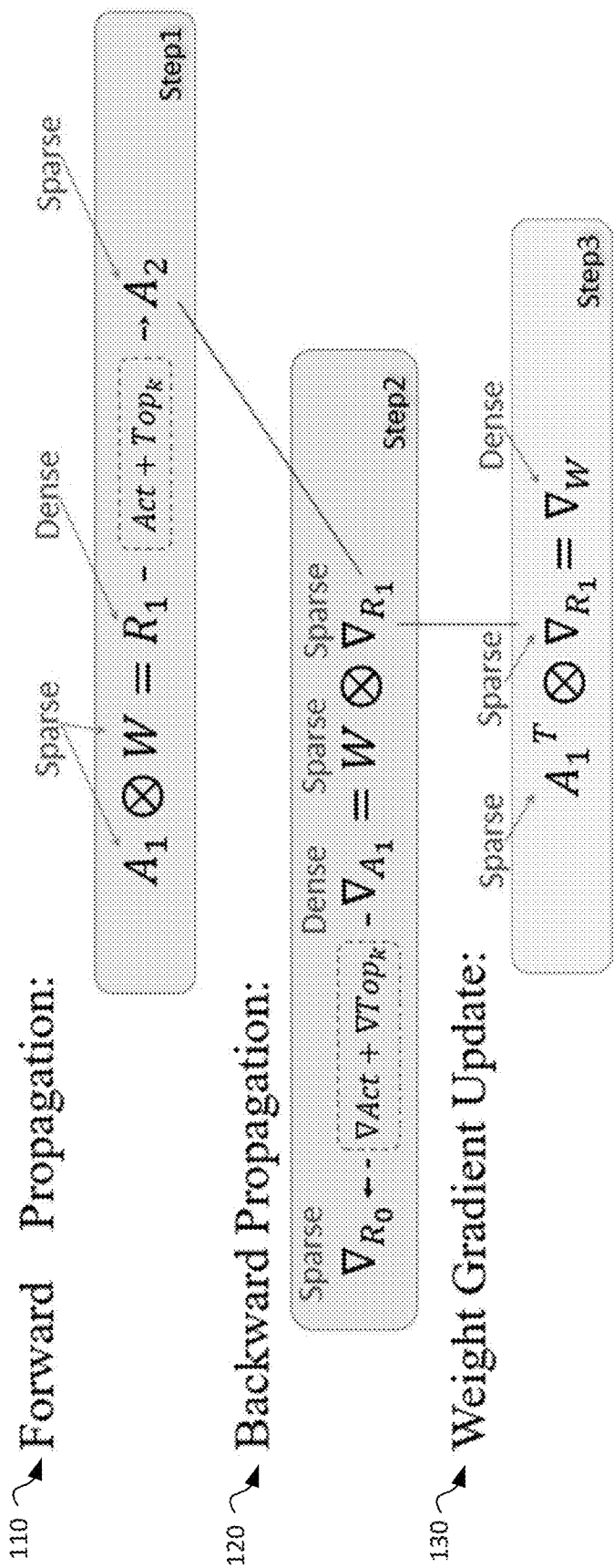
FIG. 2 illustrates an exemplary joint-AW-sparse training of NN in accordance with various embodiments.

FIG. 2 illustrates an exemplary joint-AW-sparse training of NN in accordance with various embodiments. The training process illustrated in FIG. 2 involves forward propagation 110, backward propagation 120, and weight gradient update 130 occurred at one NN layer. The indexes used in FIG. 2 are for illustrative purposes and merely to indicate the relative position of the layer, which may be generalized to other layers of the NN.

During the forward propagation 110, an input activation tensor may be received from the previous layer. In some embodiments, this input activation tensor may be pruned into a sparse input tensor, denoted as $A_1$ in FIG. 2, where index 1 indicates that the current layer is layer 1. The sparse input tensor may then be multiplied, using tensor multiplication, with the weight tensor at layer 1 to obtain an output tensor for the next layer. In some embodiments, the weight tensor at the current layer 1 may be pruned into a sparse weight tensor, denoted as W, to reduce the size of the NN and the volume of data to be processed. As shown in FIG. 2, the tensor product R1 generated based on the two sparse tensors, i.e., A1 and W, may be dense due to the nature of tensor multiplication.

In some embodiments, this dense tensor product R1 may go through activation operations and/or top-K sampling to reduce the non-zero values and obtain a sparse output tensor denoted as $A_2$, where the index 2 indicates that $A_2$ will be used as the input tensor for the next layer in the forward propagation process 110. The activation operations may include nonlinear activation functions that introduce non-linearity into the NN. Exemplary nonlinear activation functions include sigmoid, hyperbolic tangent, and rectified linear unit (ReLU). The ReLU function may apply an elementwise activation function to filter out some outputs (activations) in the dense tensor product $R_1$. A ReLU function may not change the size of the output activation tensor, but may limit the number of active neurons to improve the computational efficiency in the following layers. The top-K sampling may involve selecting the K values in each bank within the dense tensor product $R_1$ with the largest magnitudes to retain their values, and setting other values in the bank to zero. These activation and/or top-k operations effectively decrease the footprint of the tensors during the training without sacrificing accuracy as only the non-important values/features with small absolute values are zeroed out or pruned.

The above-described forward propagation 110 continues and terminates at the last layer (e.g., the output layer) of the NN. Afterward, the backward propagation 120 may be performed in a reverse direction (e.g., from the last layer to the first layer of the NN) to compute gradients in order to update the weights and/or other parameters of the NN. In some embodiments, the backward propagation 120 at layer 1 of the NN in FIG. 2 may start with computing a derivative tensor, denoted as $\nabla_{R_1}$, based on the sparse output tensor $A_2$. Since $A_2$ is sparse, the derivative tensor $\nabla_{R_1}$ is also sparse. Here, the derivative tensor may be obtained by performing derivative operations to each non-zero values in the sparse output tensor $A_2$. In some embodiments, this derivative tensor $\nabla_{R_1}$ may be used in two ways.

First, it may be used as an intermediate value for the backward propagation 120. For example, the tensor product of the sparse weight tensor at layer 1 may be multiplied with the sparse derivative tensor $\nabla_{R_1}$ to obtain a derivative version of the sparse input tensor $A_1$, which may be denoted as $\nabla_{A_1}$. As explained above, the product of two sparse tensors, e.g., W and $\nabla_{R_1}$, may be dense. In some embodiments, the activation and/or top-K sampling may be applied to prune $\nabla_{A_1}$ to obtain a spare derivative tensor $\nabla_{R_0}$ for the previous layer (e.g., layer 0). The sparse derivative tensor $\nabla_{R_0}$ may be used for the next step in the backward propagation 120.

Second, $\nabla_{R_1}$ may be used to update the weight gradients 130 at layer 1. For example, as shown in FIG. 2, the tensor product of the sparse input tensor $A_1$ at layer 1 and the sparse derivative tensor $\nabla_{R_1}$ at layer 1 may be a dense tensor indicating the gradients of the weight parameters, denoted as $\nabla_W$. The gradients of the weight parameters $\nabla_W$ may be further pruned into a sparse gradient tensor for updating the weight parameters.

As shown, the above-described joint-AW-sparse training of NN utilizes sparsity in every step of the training, including the steps in both forward propagation 110 (e.g., the activation and/or top-K operations pruning $R_1$ into $A_2$) and the backward propagation 120 (e.g., the activation and/or top-K operations pruning $\nabla_{A_1}$ into $\nabla_{R_0}$). FIG. 5 further describes how sparsity is introduced in updating the weight gradient update process 130.

Figure 3:
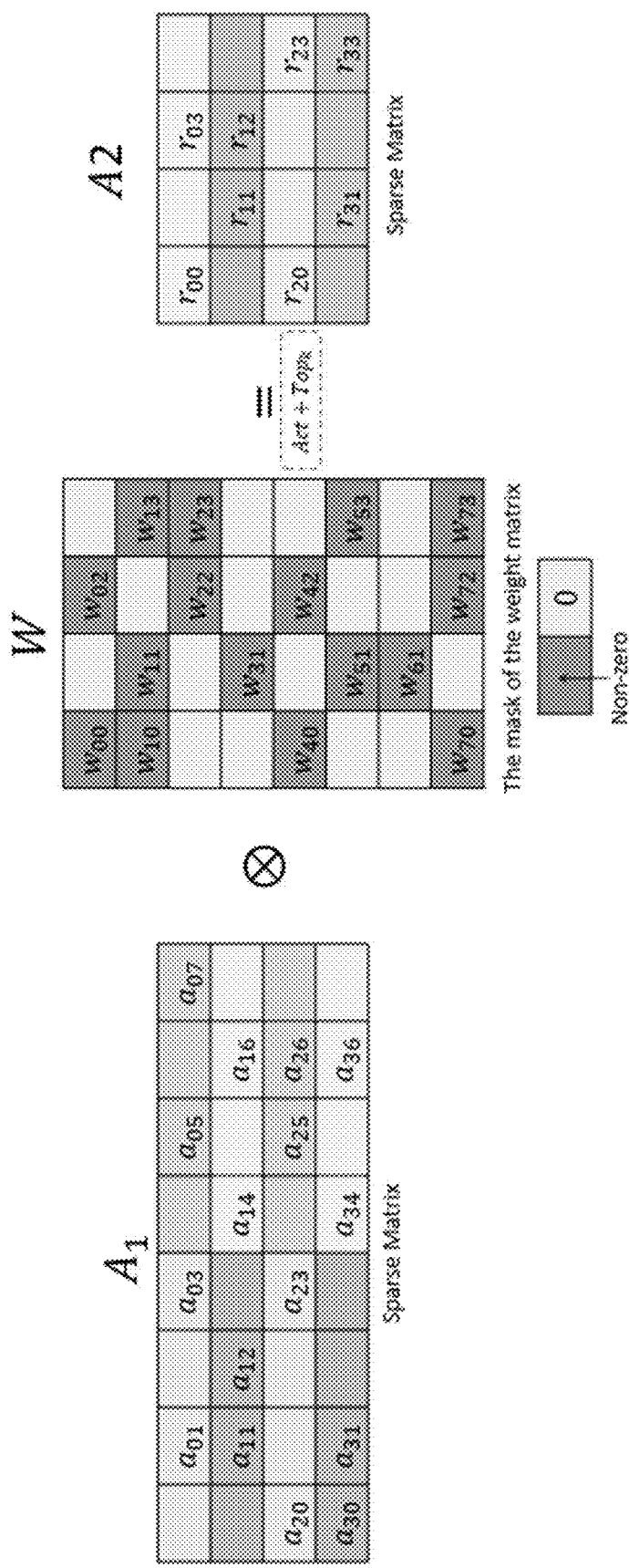
FIG. 3 illustrates an exemplary forward propagation in a joint-AW-sparse training of NN in accordance with various embodiments.

FIG. 3 illustrates an exemplary forward propagation in a joint-AW-sparse training of NN in accordance with various embodiments. The process illustrated in FIG. 3 provides more details about the forward propagation 110 in FIG. 2. The values and denotations in FIG. 3 are for illustrative purposes.

In FIG. 3, the sparse input tensor $A_1$ is received at the current layer of the NN to perform computation, e.g., matrix multiplication, with a weight tensor W of the current layer. FIG. 3 shows both tensors $A_1$ and W as 2D matrixes. In some embodiments, the weight tensor W may be pruned by applying a sparse weight tensor mask that masks off some of the weights in the weight tensor. The weights being masked may be considered as being set to zeros or disabled. In some embodiments, each layer of the NN may have one corresponding sparse weight tensor mask. The sparse weight tensor mask may be determined based on the magnitudes of the weights in the weight tensor, in which the weights with smaller magnitudes have a greater chance to be masked as zeros.

In some embodiments, the sparse $A_1$ and the sparse W may be multiplicated into a dense tensor $R_1$, which may then be pruned by going through an activation function, a top-K sampling, or both to obtain a sparse tensor $A_2$.

Figure 4:
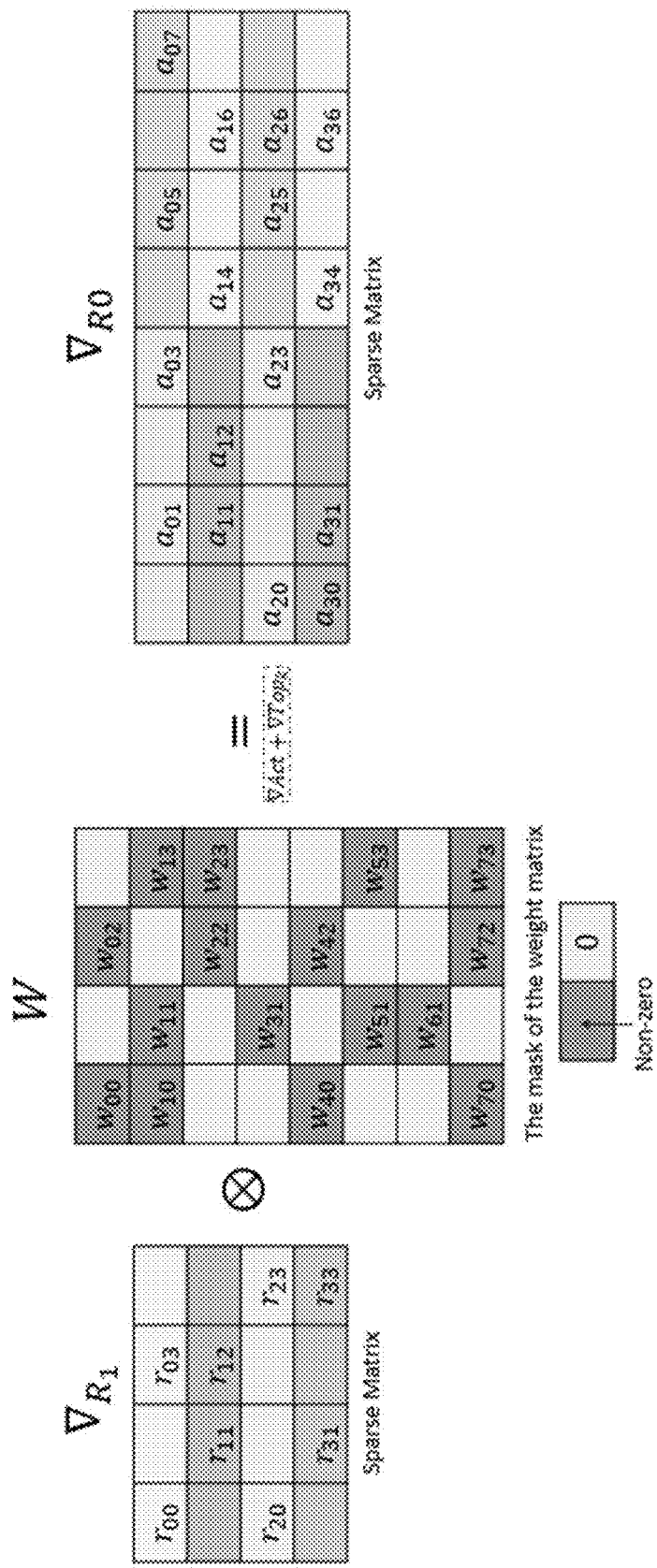
FIG. 4 illustrates an exemplary backward propagation in a joint-AW-sparse training of NN in accordance with various embodiments.

FIG. 4 illustrates an exemplary backward propagation in a joint-AW-sparse training of NN in accordance with various embodiments. The process illustrated in FIG. 3 provides more details about the backward propagation 120 in FIG. 2. The values and denotations in FIG. 4 are for illustrative purposes.

In FIG. 4, the derivative tensor $\nabla_{R_1}$ may be generated based on the sparse output tensor $A_2$ in FIGS. 2 and 3. Since $A_2$ is sparse and the derivative operations do not change the zero values, the resulting derivative tensor $\nabla_{R_1}$ is also sparse. The weight tensor W at the current layer of the NN may be pruned using the sparse weight tensor mask described in FIG. 3. The production of the two sparse tensors $\nabla_{R_1}$ and W may be a dense tensor denoted as $\nabla_{A_1}$, which may be further pruned by going through activation, top-K sampling, or both to obtain the sparse tensor $\nabla_{R_0}$. The sparse tensor $\nabla_{R_1}$ may also be used to update the weight tensor at the previous layer (e.g., layer 0), which is described in FIG. 5A.

Figure 5A:
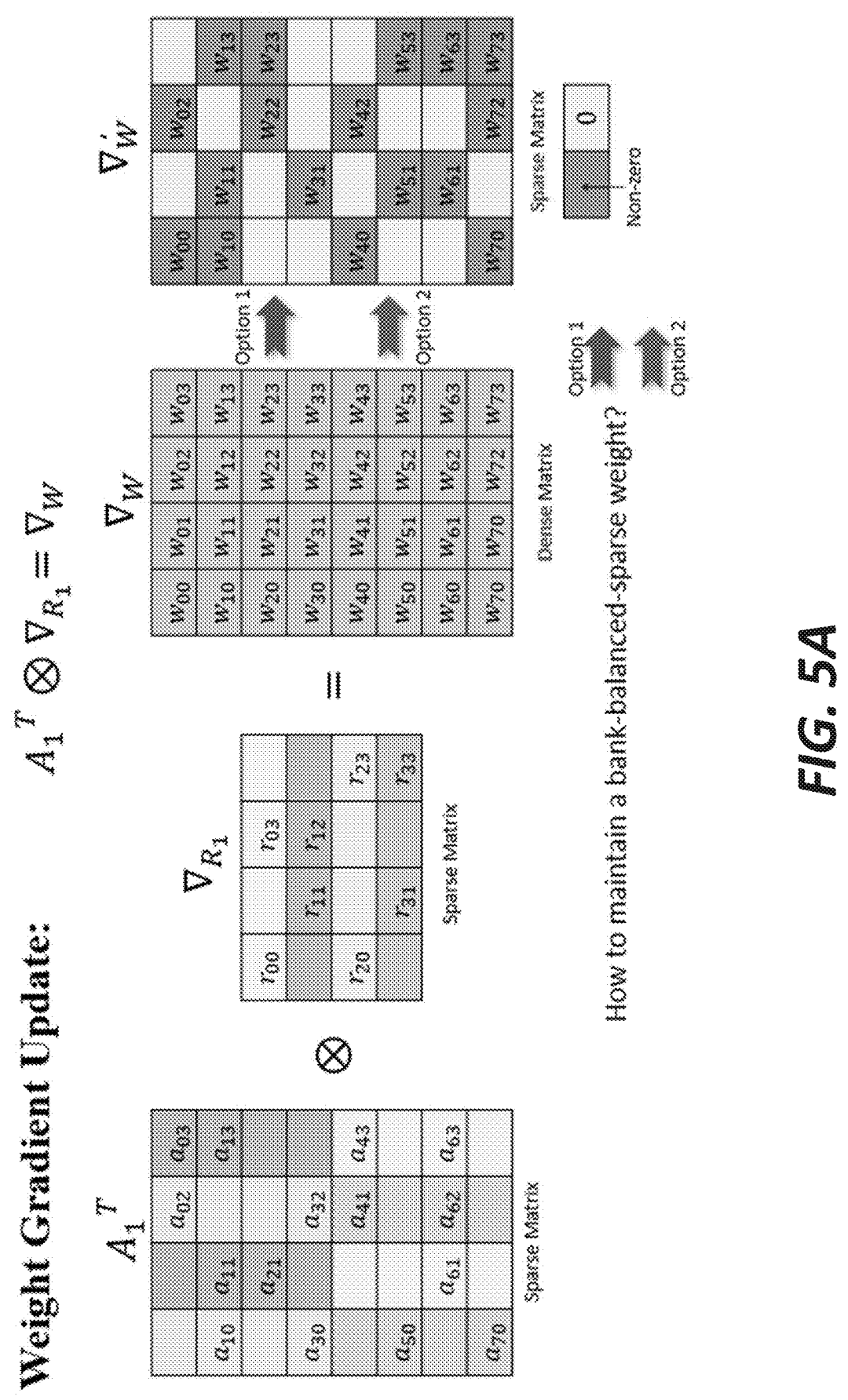

FIG. 5A illustrates an exemplary weight gradient update process in a joint-AW-sparse training of bank-balanced NN in accordance with various embodiments. With the forward propagation and backward propagation described in FIGS. 2-4, a sparse derivative tensor $\nabla_{R_i}$ may be obtained for each layer of the NN, where i refers to the index of the layer. In FIG. 5A, it is assumed that $\nabla_{R_1}$ has been obtained.

As shown in FIG. 5A, a tensor product of the sparse derivative tensor $\nabla_{R_1}$ and the transpose of the sparse input tensor $A_1$ may be a dense derivative tensor denoted as $\nabla_W$. In some embodiments, the dense derivative tensor $\nabla_W$ may be pruned in various ways.

Figure 5B:
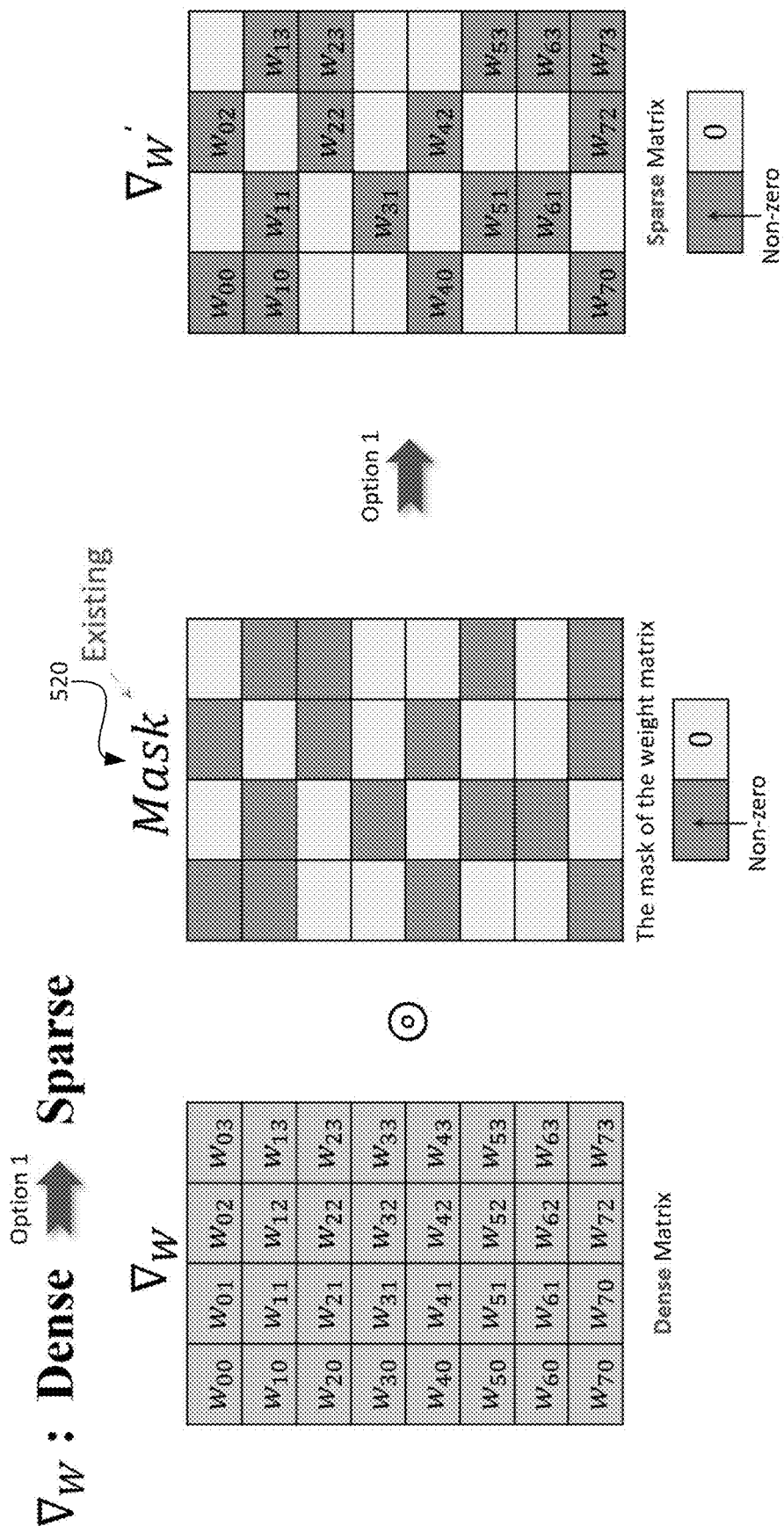
FIG. 5B illustrates an exemplary method for updating weight gradient in a joint-AW-sparse training of bank-balanced NN in accordance with various embodiments.

For example, in option 1 in FIG. 5A, the sparse weight tensor mask described in FIG. 3 may be applied to the dense derivative tensor $\nabla_W$ to obtain a sparse derivative tensor $\nabla_W'$. The sparse weight tensor mask may identify some of the weights as non-essential at the current layer and set these weights as zeros (e.g., disabling these weights or the activations corresponding to these weights). FIG. 5B illustrates a diagram showing the option 1 for updating weight gradient in a joint-AW-sparse training of bank-balanced NN in accordance with various embodiments. As shown in FIG. 5B, the existing sparse mask 520 is applied to the dense derivative tensor $\nabla_W$ to obtain a sparse derivative tensor. The existing sparse mask 520 contains a plurality of zero values to mask off the corresponding weights in the dense derivative tensor $\nabla_W$.

Figure 5C:
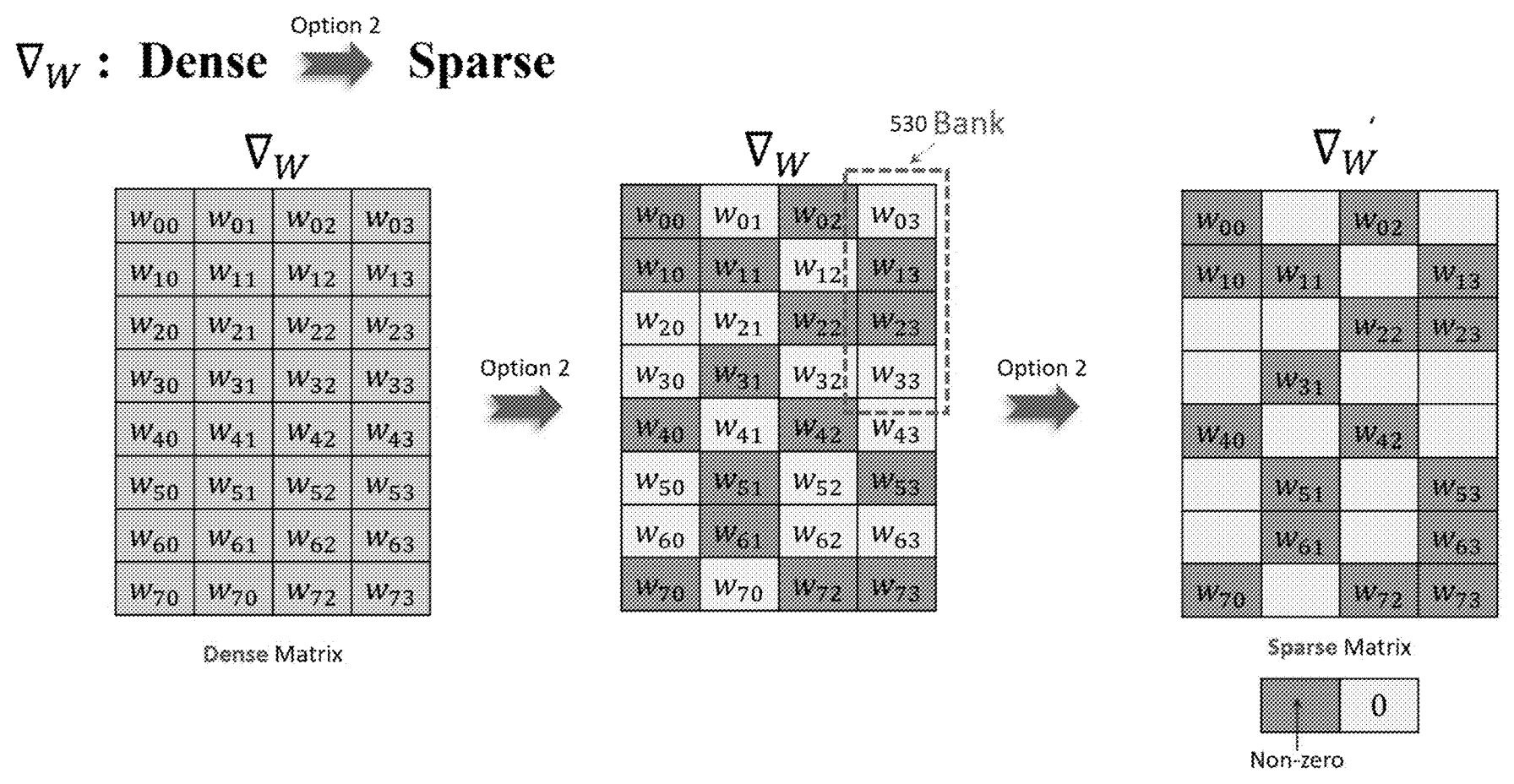

As another example, in option 2 in FIG. 5A, the dense derivative tensor $\nabla_W$ may be segmented into a plurality of banks of equal size. FIG. 5C illustrates a diagram showing the option 2 for updating weight gradient in a joint-AW-sparse training of bank-balanced NN in accordance with various embodiments. The bank 530 in FIG. 5C may be defined in different ways depending on the implementation. For example, the bank 530 may be a column or a row within the dense derivative tensor $\nabla_W$. Within each bank 530, a top-K sampling may be performed to identify K weights with the largest magnitudes (the largest positive values and negative values) and set other weights within the bank 530 as zeros, thereby generating the sparse derivative tensor $\nabla_W'$. With this top-K sampling-based pruning method, the generated $\nabla_W'$ may bank-balanced, i.e., each bank 530 includes the same number of nonzero values. In practical applications, each bank 530 of the tensors may correspond to (e.g., be stored in) a segment in a local memory of the underlying hardware (e.g., a cache in an NN training accelerator, an external memory). Thus a bank-balanced tensor may evenly distribute the non-zero values among different segments of the local memory, which may facilitate a more balance parallel processing scheme for training and inferencing. In the following descriptions, different ways of generating bank-balanced sparsified tensors are described in FIGS. 6A and 6B.

Figure 6A:
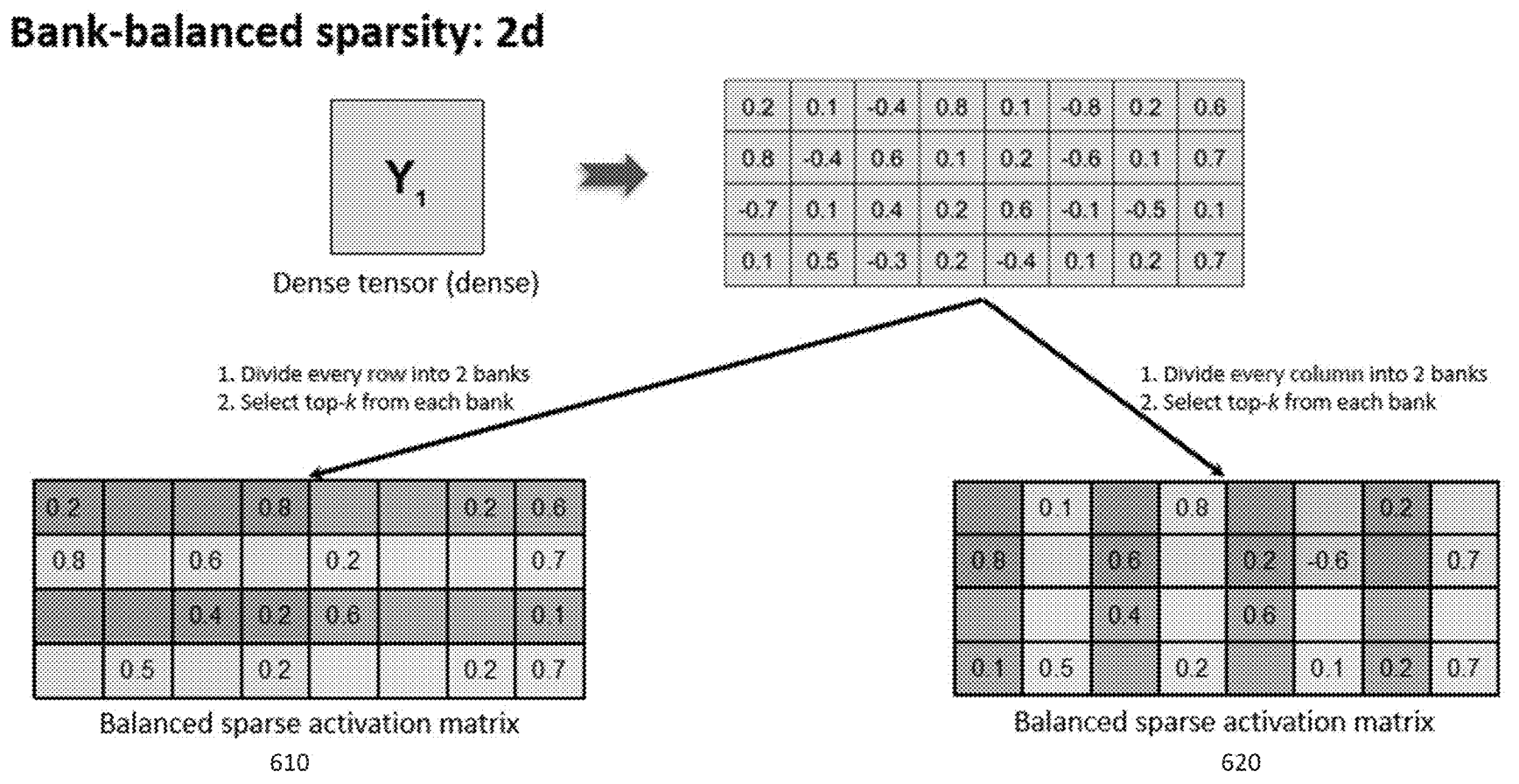

FIG. 6A illustrates an exemplary 2D sparsification for generating bank-balanced sparsified tensors in accordance with various embodiments. In FIG. 6A, the tensor to be pruned is a 2D matrix. For example, assuming an input tensor or a weight tensor is a 3D tensor, it may be segmented along with one of the three dimensions, e.g., the channel dimension, to obtain a plurality of 2D matrixes. The exemplary 2D sparsification method illustrated in FIG. 6A is appliable to each of the plurality of 2D matrixes. The tensor in FIG. 6A may refer to a weight tensor or an activation tensor in the context of NN.

As shown, a 2D dense matrix denoted as $Y_1$ may have a large number non-zero values. There are two ways to generate a bank-balanced and sparsified version of the matrix: row-wise sparsification 610 and column-wise sparsification 620. For example, in a row-wise sparsification 610, each row of the 2D dense matrix may be segmented into a plurality of banks of an equal size. Within each bank, a top-K sampling is performed to retain the K non-zero values with the largest magnitudes and set the other values to zeros. In FIG. 6A, each row of the 2D matrix is segmented into two banks, and a top-2 sampling is applied to each bank to keep 2 non-zero values therein. As another example, in a column-wise sparsification 620, each column of the 2D dense matrix may be segmented into a plurality of banks of an equal size. Within each bank, a top-K sampling is performed to retain the K non-zero values with the largest magnitudes and set the other values to zeros. In FIG. 6A, each column of the 2D dense matrix is segmented into 2 banks, and a top-1 sampling is applied to each bank to keep 1 non-zero value therein.

In some embodiments, during the above-described joint-AW-sparse training process, the row-wise sparsification or the column-wise sparsification may be applied to different layers of the NN. For example, during the weight gradient update step shown in FIG. 5A, the dense weight gradient tensor $\nabla_W$ may be pruned using the row-wise or the column-wise sparsification to obtain the sparse weight gradient tensor $\nabla'_W$. Different layers may deploy different sparsification methods to achieve optimal performance.

FIG. 6B illustrates an exemplary 3D sparsification for generating bank-balanced sparsified tensors in accordance with various embodiments. In FIG. 6B, the tensor to be pruned is assumed to be a 3D matrix, which may be an activation tensor obtained at one layer in an NN, or a weight tensor. As an example shown in FIG. 6B, the activation tensor Y1 may be obtained based on an input tensor X, a weight tensor W, and a bias tensor B. The activation tensor Y1 may have three dimensions: a height dimension, a width dimension, and a channel dimension.

There are several approaches to generate the bank-balanced and sparsified tensor based on the 3D dense matrix, such as 630-650 illustrated in FIG. 6B. These approaches differ in how a bank is defined. For example, in approach 630, one channel is considered as a bank, e.g., the front plane/surface may be considered as a bank. As another example, in approach 640, each channel may be divided into a plurality of banks of an equal size. As yet another example, in approach 650, multiple channels may be considered as one bank. After the banks are defined, a top-K sampling may be performed with each bank to retain the K non-zero values with the largest magnitudes and set the other values to zeros. In some embodiments, different ways of segmenting banks may require different storage schemes to allow the data within each bank is physically co-located in the memory. Storing each bank continuously may facilitate sequential readings (reduces the number of memory access) and evenly distribute the non-zero data for better parallel processing.

In comparison with the 2D sparsification approaches described in FIG. 6A, the 3D sparsification may preserve the inherent weight relationships across more dimensions, while the 2D sparsification may be easier to implement. Depending on the use cases and preferences, either of the sparsification approaches may be deployed to generate the bank-balanced and sparse tensors.

FIG. 7 illustrates an example method for joint-AW-sparse training of a bank-balanced NN in accordance with various embodiments. The method 700 may be performed by a device, apparatus, or system for optimizing resource allocation. The operations of the method 700 presented below are intended to be illustrative. Depending on the implementation, the method 700 may include additional, fewer, or alternative steps performed in various orders or in parallel.

Block 710 includes during a forward propagation at a current layer of a neural network: generating, based on a sparse input tensor and a sparse weight tensor of the current layer, a dense output tensor; and obtaining a sparse output tensor by sparsifying the dense output tensor. In some embodiments, the dense output tensor comprises a tensor product of the sparse input tensor and the sparse weight tensor of the current layer; and the dense derivative tensor comprises a tensor product of the first sparse derivative tensor and the sparse weight tensor of the current layer. In some embodiments, the obtaining a sparse output tensor by sparsifying the dense output tensor comprises: applying a top-K activation function to the dense output tensor to obtain the sparse output tensor; and the obtaining a second sparse derivative tensor by sparsifying the dense derivative tensor comprises: applying the top-K activation function to the dense derivative tensor to obtain the second sparse derivative tensor. In some embodiments, the current layer of the neural network comprise a dense weight tensor and corresponds to a weight tensor mask, and the sparse weight tensor of the current layer is obtained by: disabling one or more weights in the dense weight tensor by applying the weight tensor mask to the dense weight tensor to obtain the sparse weight tensor.

Block 720 includes during a backward propagation at the current layer of the neural network: determining a first sparse derivative tensor based on the sparse output tensor; obtaining a dense derivative tensor based on the first sparse derivative tensor and the sparse weight tensor of the current layer; and obtaining a second sparse derivative tensor by sparsifying the dense derivative tensor.

Block 730 training weight tensors of the neural network based on the first sparse derivative tensor and the second sparse derivative tensor. In some embodiments, the training the weight tensors of the neural network comprises: determining a new sparse weight tensor for a previous layer based on the second sparse derivative tensor. In some embodiments, the training the weight tensors of the neural network comprises: determining a new sparse weight tensor for the current layer based on the first sparse derivative tensor and the sparse input tensor.

In some embodiments, the current layer of the neural network corresponds to a weight tensor mask, and the determining a new sparse weight tensor for the current layer comprises: obtaining a dense derivative weight tensor based on a tensor product of the first sparse derivative tensor and a transpose of the sparse input tensor; and disabling one or more weights in the dense derivative weight tensor by applying the weight tensor mask to the dense derivative weight tensor to obtain the new sparse weight tensor for the current layer.

In some embodiments, the dense derivative weight tensor comprises a plurality of gradients corresponding to a plurality of weight parameters at the current layer of the neural network. In some embodiments, the determining a new sparse weight tensor for the current layer comprises: obtaining a dense derivative weight tensor based on a tensor product of the first sparse derivative tensor and a transpose of the sparse input tensor; and applying a top-K activation function to the dense derivative weight tensor to obtain the new sparse weight tensor for the current layer.

In some embodiments, applying the top-K activation function comprises: dividing each row or column of the dense derivative weight tensor into a plurality of banks corresponding to memory banks of processors; and for each of the plurality of banks, determining top-K weights in the bank and disabling weights in the bank that are not the top-K weights.

Figure 8:
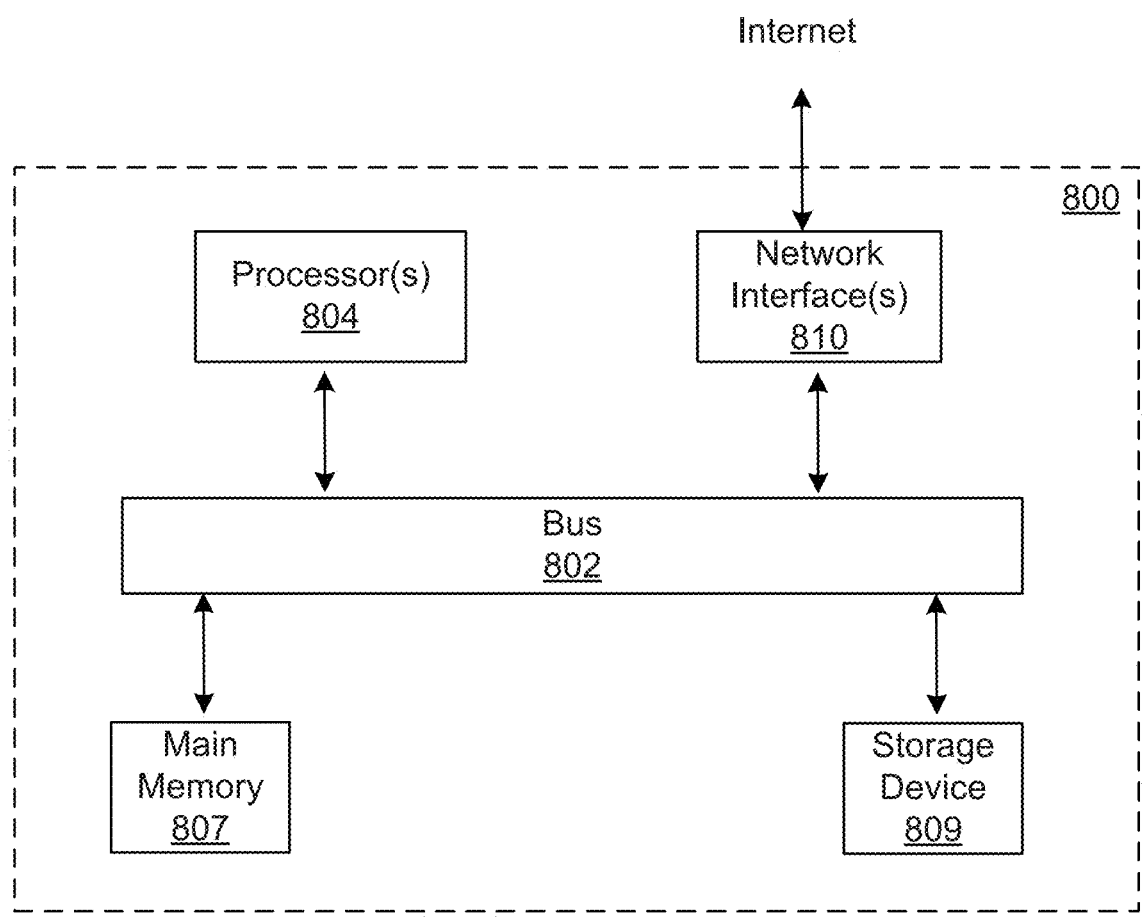
FIG. 8 illustrates an example computer system in which any of the embodiments described herein may be implemented.

FIG. 8 illustrates an example computing device in which any of the embodiments described herein may be implemented. The computing device may be used to implement one or more components of the systems and the methods shown in FIGS. 1-7. The computing device 800 may comprise a bus 802 or other communication mechanisms for communicating information and one or more hardware processors 804 coupled with bus 802 for processing information. Hardware processor(s) 804 may be, for example, one or more general-purpose microprocessors.

The computing device 800 may also include a main memory 807, such as random-access memory (RAM), cache and/or other dynamic storage devices, coupled to bus 802 for storing information and instructions to be executed by processor(s) 804. Main memory 807 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 807 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 807. Such instructions may be read into main memory 807 from another storage medium, such as storage device 809. Execution of the sequences of instructions contained in main memory 807 may cause processor(s) 804 to perform the process steps described herein. For example, the processes/methods disclosed herein may be implemented by computer program instructions stored in main memory 807. When these instructions are executed by processor(s) 804, they may perform the steps as shown in corresponding figures and described above. In alternative embodiments, hard-wired circuitry may be used in place of or in combination with software instructions.

The computing device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A computer-implemented method for optimizing neural network training, comprising:
   during a forward propagation at a current layer of a neural network:
      generating, based on a sparse input tensor and a sparse weight tensor of the current layer, a dense output tensor, and
      sparsifying the dense output tensor to obtain a sparse output tensor;
   during a backward propagation at the current layer of the neural network:
      determining a first sparse derivative tensor based on the sparse output tensor,
      obtaining a dense derivative tensor based on the first sparse derivative tensor and the sparse weight tensor of the current layer, and
      sparsifying the dense derivative tensor to obtain a second sparse derivative tensor; and
   training weight tensors of the neural network based on the first sparse derivative tensor and the second sparse derivative tensor, wherein the training comprises determining a new sparse weight tensor for the current layer based on the first sparse derivative tensor and the sparse input tensor.

2. The method of claim 1, wherein the dense output tensor comprises a tensor product of the sparse input tensor and the sparse weight tensor of the current layer; and
the dense derivative tensor comprises a tensor product of the first sparse derivative tensor and the sparse weight tensor of the current layer.

3. The method of claim 1, wherein the training the weight tensors of the neural network comprises:
determining a new sparse weight tensor for a previous layer based on the second sparse derivative tensor.

4. The method of claim 1, wherein the current layer of the neural network corresponds to a weight tensor mask, and
the determining a new sparse weight tensor for the current layer comprises:
obtaining a dense derivative weight tensor based on a tensor product of the first sparse derivative tensor and a transpose of the sparse input tensor; and
disabling one or more weights in the dense derivative weight tensor by applying the weight tensor mask to the dense derivative weight tensor to obtain the new sparse weight tensor for the current layer.

5. The method of claim 4, wherein the dense derivative weight tensor comprises a plurality of gradients corresponding to a plurality of weight parameters at the current layer of the neural network.

6. The method of claim 1, wherein the determining a new sparse weight tensor for the current layer comprises:
obtaining a dense derivative weight tensor based on a tensor product of the first sparse derivative tensor and a transpose of the sparse input tensor; and
applying a top-K activation function to the dense derivative weight tensor to obtain the new sparse weight tensor for the current layer.

7. The method of claim 6, wherein applying the top-K activation function comprises:
dividing each row or column of the dense derivative weight tensor into a plurality of banks corresponding to memory banks of processors; and
for each of the plurality of banks, determining top-K weights in the bank and disabling weights in the bank that are not the top-K weights.

8. The method of claim 1, wherein the sparsifying the dense output tensor to obtain a sparse output tensor comprises:
applying a top-K activation function to the dense output tensor to obtain the sparse output tensor; and
the sparsifying the dense derivative tensor to obtain a second sparse derivative tensor comprises:
applying the top-K activation function to the dense derivative tensor to obtain the second sparse derivative tensor.

9. The method of claim 1, wherein the current layer of the neural network comprise a dense weight tensor and corresponds to a weight tensor mask, and the sparse weight tensor of the current layer is obtained by:
disabling one or more weights in the dense weight tensor by applying the weight tensor mask to the dense weight tensor to obtain the sparse weight tensor.

10. A system comprising one or more processors and one or more non-transitory computer-readable memories coupled to the one or more processors and configured with instructions executable by the one or more processors to cause the system to perform operations comprising:
during a forward propagation at a current layer of a neural network:
generating, based on a sparse input tensor and a sparse weight tensor of the current layer, a dense output tensor, and
sparsifying the dense output tensor to obtain a sparse output tensor;
during a backward propagation at the current layer of the neural network:
determining a first sparse derivative tensor based on the sparse output tensor,
obtaining a dense derivative tensor based on the first sparse derivative tensor and the sparse weight tensor of the current layer, and
sparsifying the dense derivative tensor to obtain a second sparse derivative tensor; and
training weight tensors of the neural network based on the first sparse derivative tensor and the second sparse derivative tensor, wherein the training comprises determining a new sparse weight tensor for the current layer based on the first sparse derivative tensor and the sparse input tensor.

11. The system of claim 10, wherein the sparsifying the dense output tensor to obtain a sparse output tensor comprises:
applying a top-K activation function to the dense output tensor to obtain the sparse output tensor; and
the sparsifying the dense derivative tensor to obtain a second sparse derivative tensor comprises:
applying the top-K activation function to the dense derivative tensor to obtain the second sparse derivative tensor.

12. The system of claim 11, wherein the current layer of the neural network corresponds to a weight tensor mask, and
the determining a new sparse weight tensor for the current layer comprises:
obtaining a dense derivative weight tensor based on a tensor product of the first sparse derivative tensor and a transpose of the sparse input tensor; and
disabling one or more weights in the dense derivative weight tensor by applying the weight tensor mask to the dense derivative weight tensor to obtain the new sparse weight tensor for the current layer.

13. The system of claim 11, wherein the current layer of the neural network corresponds to a weight tensor mask, and
the determining a new sparse weight tensor for the current layer comprises:
obtaining a dense derivative weight tensor based on a tensor product of the first sparse derivative tensor and a transpose of the sparse input tensor; and
disabling one or more weights in the dense derivative weight tensor by applying the weight tensor mask to the dense derivative weight tensor to obtain the new sparse weight tensor for the current layer.

14. A non-transitory computer-readable storage medium configured with instructions executable by one or more processors to cause the one or more processors to perform operations comprising:
during a forward propagation at a current layer of a neural network:
generating, based on a sparse input tensor and a sparse weight tensor of the current layer, a dense output tensor; and
sparsifying the dense output tensor to obtain a sparse output tensor;
during a backward propagation at the current layer of the neural network:

determining a first sparse derivative tensor based on the sparse output tensor, obtaining a dense derivative tensor based on the first sparse derivative tensor and the sparse weight tensor of the current layer, and sparsifying the dense derivative tensor to obtain a second sparse derivative tensor; and training weight tensors of the neural network based on the first sparse derivative tensor and the second sparse derivative tensor, wherein the training comprises determining a new sparse weight tensor for the current layer based on the first sparse derivative tensor and the sparse input tensor.

15. The non-transitory computer-readable storage medium of claim 14, wherein the current layer of the neural network corresponds to a weight tensor mask, and the determining a new sparse weight tensor for the current layer comprises:

obtaining a dense derivative weight tensor based on a tensor product of the first sparse derivative tensor and a transpose of the sparse input tensor; and disabling one or more weights in the dense derivative weight tensor by applying the weight tensor mask to the dense derivative weight tensor to obtain the new sparse weight tensor for the current layer.

16. The non-transitory computer-readable storage medium of claim 14, wherein the current layer of the neural network corresponds to a weight tensor mask, and the determining a new sparse weight tensor for the current layer comprises:

obtaining a dense derivative weight tensor based on a tensor product of the first sparse derivative tensor and a transpose of the sparse input tensor; and disabling one or more weights in the dense derivative weight tensor by applying the weight tensor mask to the dense derivative weight tensor to obtain the new sparse weight tensor for the current layer.

17. The non-transitory computer-readable storage medium of claim 14, wherein the sparsifying the dense output tensor to obtain a sparse output tensor comprises:

applying a top-K activation function to the dense output tensor to obtain the sparse output tensor; and the sparsifying the dense derivative tensor to obtain a second sparse derivative tensor comprises:

applying the top-K activation function to the dense derivative tensor to obtain the second sparse derivative tensor.

\* \* \* \* \*